United States Patent
Sager

(10) Patent No.: US 7,066,079 B2
(45) Date of Patent: Jun. 27, 2006

(54) AUTOMATIC COFFEE MACHINE

(75) Inventor: Peter Sager, Boppelsen (CH)

(73) Assignee: HGZ Maschinenbau AG, Dallikon (CH)

( * ) Notice: Subject to any disclaimer, the term of this patent is extended or adjusted under 35 U.S.C. 154(b) by 53 days.

(21) Appl. No.: 11/128,726

(22) Filed: May 13, 2005

(65) Prior Publication Data
US 2005/0252383 A1    Nov. 17, 2005

(30) Foreign Application Priority Data
May 14, 2004   (DE)   ................ 10 2004 023 964

(51) Int. Cl.
*A47J 31/043*   (2006.01)
(52) U.S. Cl. .................. 99/280; 99/286; 99/289 R; 99/297; 99/302 P
(58) Field of Classification Search ................ 99/494, 99/495, 286–303, 280; 426/433
See application file for complete search history.

(56) References Cited

U.S. PATENT DOCUMENTS

| | | | | |
|---|---|---|---|---|
| 3,266,410 A | * | 8/1966 | Novi et al. | 99/287 |
| 4,457,216 A | * | 7/1984 | Dremmel | 99/287 |
| 4,934,258 A | * | 6/1990 | Versini | 99/289 R |
| 5,230,277 A | * | 7/1993 | Bianco | 99/287 |
| 5,277,102 A | * | 1/1994 | Martinez et al. | 99/280 |
| 5,309,822 A | * | 5/1994 | Sager | 99/289 R |
| 5,471,910 A | * | 12/1995 | Sager | 99/289 R |

FOREIGN PATENT DOCUMENTS

| | | |
|---|---|---|
| DE | 4333697 A1 | 4/1993 |
| EP | 0641536 B1 | 7/1996 |

* cited by examiner

*Primary Examiner*—Timothy F. Simone
(74) *Attorney, Agent, or Firm*—Thomas, Kayden, Horstemeyer & Risley LLP

(57) ABSTRACT

An automatic coffee machine (1) includes a sliding block (28) fixedly connected to a housing (2). A brewing unit (5) includes an upper and a lower locking element (7, 8) and a vertical tube section (4). The upper locking element (7) is alternately moved in a brewing position, a stand-by position and a parking position. The upper locking element (7) in the brewing position protrudes into the tube section (4) to attain a brewing chamber (6). The upper locking element (7) in the stand-by position does not protrude into the tube section (4) and the axis of the upper locking element (7) is aligned with the axis (9) of the tube section (4). The upper locking element (7) in the parking position does not protrude into the tube section (4) and the axis of the upper locking element (7) is not aligned with the axis (9) of the tube section (4). A pivot column (15) connected to the upper locking element (7) is moved in an axial direction, and it is rotated about its axis. The pivot column (15) includes a sliding path (23) including a first portion (24) parallel to the axis of the pivot column (15) and a second portion (25) extending in a way similar to a thread. The sliding block (28) engages the first portion (24) to alternately attain the brewing position and the stand-by position. The sliding block (28) engages the second portion (25) to alternately attain the stand-by position and the parking position.

20 Claims, 4 Drawing Sheets

AUTOMATIC COFFEE MACHINE

CROSS REFERENCE TO RELATED APPLICATIONS

This application claims priority to co-pending German Patent Application No. DE 10 2004 023 964.9 entitled "Kaffeemaschinenautomat", filed May 14, 2004.

FIELD OF THE INVENTION

The present invention generally relates to an automatic coffee machine. More particularly, the present invention relates to an automatic coffee machine for providing single cups of coffee or small jugs of coffee.

Such an automatic coffee machine is to be understood as a machine which automatically mills the coffee beans to attain coffee powder, introduces the coffee powder into the brewing chamber, brews the coffee and finally discharges the used tablet of coffee powder without the user having to manually initiate or support these or other method steps. It is to be understood that the automatic coffee machine however has to be started by the user to initiate a cycle by pressing a button and the like. The automatic coffee machine may also be designed as a brewing apparatus for providing a greater volume of fresh coffee.

BACKGROUND OF THE INVENTION

An automatic coffee machine is known from European Patent No. EP 0 641 536 B1 corresponding to U.S. Pat. No. 5,471,910. The known automatic coffee machine includes a brewing unit including a brewing chamber being formed by a stationary tube section including a vertical axis and two locking elements, namely an upper locking element and a lower locking element. The upper locking element is connected to a rotary arm. The tube section is also called a brewing tube. An axial drive serves to move the rotary arm such that the upper locking element is introduced into the tube section and such that it leaves the tube section, respectively. A pivot drive serves to move the upper locking element into a parking position in which it is located outside of the axis of the tube section and into a stand-by position in which it is located in the axis of the tube section, respectively.

The axial drive and the pivot drive for the upper locking element are designed to be combined. The combined axial and pivot drive includes a worm transmission being located downstream of a motor and an axially movable and rotatable pivot column for moving the upper locking element (which is fixedly connected to the rotary arm) to reach a brewing position in which the locking element protrudes into the tube section. It also serves to move the upper stop element out off the tube section when moving the upper locking element into the parking position outside of the axis of the tube section and into the stand-by position in the axis of the tube section. The upper locking element is fixedly connected to the rotary arm to be commonly rotated therewith. One single motor serves to drive the combined axial and pivotal drive of the rotary arm with the upper locking element as well as a funnel and a pivoted coffee removing element. This motor is connected to the worm transmission and a dividing transmission located downstream thereof. The worm transmission is located on a spindle of the pivot column. The dividing transmission is located above the worm transmission, and it includes a guiding bush surrounding the pivot column, a channel bush surrounding the guiding bush, a bolt and a sliding block. The channel bush is arranged in the housing in a stationary manner, and it includes a bore for this purpose. The bolt engages the bore, the bolt being screwed into the housing in a radial direction from outside towards the inside. The bolt protrudes through the guiding bush in the region of a slot extending along a part of the circumference in a radial direction. In this way, the guiding bush cannot move in an axial direction while it may pivot with respect to the channel bush. The stationary channel bush includes a sliding path. The sliding path at its lower end includes a beginning portion being parallel to the axis. A thread-like increasing portion is located next to the beginning portion. The guiding bush also includes a sliding path which is parallel to the axis. The sliding block cooperates with the two sliding paths located in the channel bush and in the guiding bush. The sliding block is screwed into the pivot column. The known dividing transmission has a comparatively great number of components, and it is comparatively complicated and expensive.

The known automatic coffee machine includes a combined axial and pivot drive for the upper locking element and a separate vertical drive for the lower locking element. In this way, the two locking elements may be moved with respect to the tube section of the brewing chamber independent from one another to realize pressing, releasing and lifting of the tablet of coffee powder. There is no negative effect for the upper locking element during different phases of the brewing cycle. All stroke-like movements and pivotal movements of the upper locking element are derived from a combined drive by means of the dividing transmission. The specific movements may be determined in an exact and reproducible way. In this way, the control unit is relieved. Some movements are mechanically coupled by the dividing transmission. This does not only simplify the construction of the control unit, but it also increases operational safety in an advantageous way. The respective movements of the upper locking element and of the pivoted coffee removing element are derived from a drive, and they are coordinated with one another. Only a low number of sensors are required, and the mechanical forced coupling of the movements is advantageous. The stripping effect is coupled with the opening movement, meaning the pivotal movement from the stand-by position into the parking position. It is not necessary to realize and to drive a coffee charger. Due to the fact that the parking position is located outside of the axis of the brewing chamber, the brewing chamber is freely accessible from above. In this way, it is possible to arrange a unit for feeding coffee powder in a stationary way such that the coffee powder may be milled to be directly introduced into the brewing chamber. Due to the division of the movement of the upper locking element into an axial section between the brewing position and the stand-by position and a thread-like increasing section between the stand-by position and the parking position, it is possible to arrange up to three or more units for feeding coffee powder in a stationary way. In this way, it is possible to mill different kinds of coffee or different coffee bean preparations, as it is required for normal coffee, cappuccino, mocca and the like.

Furthermore, a vertical drive is connected to the lower locking element. The vertical drive includes another motor, a worm transmission located downstream of the motor and a spindle being guided in an axial direction. The spindle carries the lower locking element. In case the seal of the lower locking element of the brewing chamber shows a defect, there is the danger of a mixture of coffee and coffee powder entering the worm transmission and even the interior of the motor of the vertical drive. The worm transmission and the motor of the combined axial and pivotal drive may be damaged since the two worm drives and the two motors form a unit surrounded by a common housing.

Another automatic coffee machine is known from German Patent Application No. DE 41 33 697 A1 corresponding to U.S. Pat. No. 5,309,822. The upper locking element of the brewing unit is arranged at a rotary arm which is arranged to be pivoted about a stationary bearing. The upper locking element connected to the rotary arm can be pivoted from a stand-by position in the axis of the tube section above the brewing chamber into a parking position outside of the axis of the tube section. A pivot drive designed as an electric motor including a worm transmission located downstream thereof serves for this pivotal movement. An axial drive is also arranged on the rotary arm. The upper locking element can be moved into the tube section in a sealing way by the axial drive to reach the brewing position coming from the stand-by position. Furthermore, the known automatic coffee machine includes a vertical drive for the lower locking element. In this way, the known automatic coffee machine includes three drives for moving the two end pieces. Due to the arrangement of the rotary arm in a stationary bearing, it is possible to position and guide the upper locking element of the brewing chamber with the required exactness starting from the parking position to reach the stand-by position and the following brewing position without having to design the upper locking element as two parts. Furthermore, the known automatic coffee machine includes a pivoted coffee removing element for removing the tablet of coffee powder. The pivoted coffee removing element is connected to the rotary arm. Discharge of the used tablets of coffee powder is realized by pivotal movement of the rotary arm about its stationary bearing. The direction of the pivotal movement coincides with the direction of movement from the stand-by position into the parking position. Consequently, it is necessary to pivot the rotary arm back and forth twice during one brewing cycle. The first pivotal movement back and forth serves to realize brewing. The second movement back and forth serves to discharge the used tablet. The tablet has to be discharged in the parking position, and the upper locking element must not be located above the brewing chamber. The control unit of the automatic coffee machine has to take this into account.

SUMMARY OF THE INVENTION

The present invention relates to an automatic coffee machine. The automatic coffee machine includes a housing. A sliding block is fixedly connected to the housing. A brewing unit includes an upper locking element having an axis, a lower locking element and a tube section having a vertical axis. The upper and lower locking elements and the tube section are designed and arranged to alternately attain a brewing position, a stand-by position and a parking position. The upper locking element in the brewing position protruding into the tube section such that a brewing chamber is formed in which coffee can be brewed. The upper locking element in the stand-by position does not protrude into the tube section and the axis of the upper locking element is aligned with the axis of the tube section. The upper locking element in the parking position does not protruding into the tube section and the axis of the upper locking element is not aligned with the axis of the tube section. A rotary arm is connected to the upper locking element. A pivot column has a circumference and an axis. The pivot column is connected to the rotary arm. The pivot column is designed and arranged to be movable in an axial direction and to be rotatable about its axis. The pivot column includes a sliding path. The sliding path includes a first portion which is parallel to the axis of the pivot column and a second portion which extends about at least a part of the circumference of the pivot column in a way similar to a thread and not to be parallel to the axis of the pivot column. The first portion of the sliding path of the pivot column is designed and arranged such that the sliding block engages the first portion to alternately attain the brewing position and the stand-by position. The second portion of the sliding path of the pivot column is designed and arranged such that the sliding block engages the second portion to alternately attain the stand-by position and the parking position.

The novel automatic coffee machine has a comparatively simple structure. Especially, the brewing cycle is simplified without having negative effects with respect to the steps of compressing, releasing and discharging the tablet of coffee powder.

The sliding path including the first portion which is parallel to the axis of the pivot column serves to transfer the upper locking element from the brewing position into the stand-by position. The thread-like increasing portion of the sliding path serves to pivot the rotary arm with the upper locking element from the stand-by position into the parking position.

Other than in the prior art, the sliding path is no longer located at a separate channel bush, but instead directly at the pivot column. In combination with this arrangement, it is only necessary to arrange the sliding block at the housing in a stationary manner. The sliding block engages the sliding path. A channel bush and a bolt protruding through the channel bush and through the sliding bush known from the prior art are no longer required in the novel automatic coffee machine. No guide bush has to be located between the pivot column and a channel bush in a radial direction. Instead, it is possible to arrange a small guiding ring being offset in an axial direction. Nevertheless, the pivotal movement of the funnel and of the pivoted coffee removing element may be derived from the guiding ring. For this purpose, the guiding ring is arranged to be offset with respect to the sliding path and the sliding block in an axial direction. Preferably, it is located above these elements and to surround the pivot column. The guiding ring is fixedly connected to the pivot column to be commonly rotated therewith, but to be movable in an axial direction such that the guiding ring with the pivoted coffee removing element and the funnel connected thereto does not fulfill a movement during a pure axial movement of the pivot column, but to follow the pivot column during a rotational movement. The entire dividing transmission formed in this way includes a decreased number of single components, and it is thus comparatively inexpensive in manufacture and assembly. The dividing transmission preferably has a decreased diameter and reduced space requirement.

The present invention may also be used in combination with a flow heater. In other words, there is the possibility of especially surrounding the brewing chamber with a flow heater to ensure quick readiness for service of the automatic coffee machine. Both motors may be located below the flow heater, meaning at a place which is not subjected to great thermal stress. The housing of the flow heater may also form the housing of the brewing chamber and of the dividing transmission at the same time such that it is not necessary to arrange a separate housing. Furthermore, the tube section of the brewing chamber is located in this common housing. Thus, one attains one big housing only. This housing may be manufactured with great exactness without problems. The level of exactness required for positioning the elements with respect to one another is automatically achieved. Especially, the distance between the axis of the brewing chamber and the axis of the dividing transmission is specified.

The automatic coffee machine may further include a first drive. The first drive includes a first motor and a first transmission. The first transmission may be arranged downstream of the motor. The first transmission may be operatively connected to the first motor to be driven by the first motor. The first transmission may be operatively connected to the pivot column to drive the pivot column. The first motor has an axis and the rotary arm has an axis. The axis of the motor may be arranged to be parallel to and spaced apart from the axis of the rotary arm. The first motor may be arranged above the first transmission. The automatic coffee machine may further include a pivoted coffee removing element. The pivoted coffee removing element is designed and arranged to be pivoted to remove a tablet of coffee powder from the lower locking element after use of the tablet of coffee powder. The first motor may be designed and arranged to drive the pivoted coffee removing element. The automatic coffee machine may further include a second drive. The second drive includes a second motor and a second transmission. The second transmission includes a spindle, the spindle being driven by the second motor and being operatively connected to the lower locking element such that the lower locking element is moved in the tube section in the direction of the vertical axis of the tube section. The first and second drive may be designed and arranged to be independent from one another. The term independent relates to the realization of separate units including a motor and a transmission for the combined axial and pivotal drive, on the one hand, and for the vertical drive, on the other hand. In this case, a common housing, or a common support are not desired. The respective motor is located at a higher place than the respective transmission such that a mixture of coffee and coffee powder cannot enter the motor and negatively influence the motor during failure of the seal located at the lower locking element of the brewing chamber. Even if a different defect occurs, the single elements of the two units may be replaced or repaired at comparatively low costs independent from one another.

Each of the motors may be supported on a bracket. In this case, it is not desired to use a common housing. The separate elements of the drives are arranged with great ease of service, meaning in a way to be easily accessible and visible. The independent design and arrangement of the separate units each including a motor and a transmission for the combined axial and pivotal drive, on the one hand, and for the vertical drive, on the other hand, located downstream of the motor is not known from the prior art. This design may be used in combination with the design of the dividing transmission or independent therefrom.

The dividing transmission may be designed in a way that the pivoted coffee removing element discharges the tablet of coffee powder during the movement of the upper stop element from the stand-by position into the parking position. The pivoted coffee removing element is not connected to the rotary arm, but it is separately supported such that its movement may be derived in a separate way. The movement of the upper locking element, on the one hand, and of the pivoted coffee removing element, on the other hand, is coordinated, and it is coupled by the dividing transmission. The coupling is realized in a way that the direction of the stripping movement corresponds to the direction of the pivotal movement of the upper stop element from the stand-by position into the parking position. In this way, there is the advantage of only requiring one single pivotal movement back and forth within a brewing cycle. Thus, the brewing cycle may be realized in a faster and simplified way.

The transmission located downstream of the first motor and/or the second motor may preferably include a toothed belt, a V-belt or engaging gear wheels. It is preferred to design at least the transmission for the vertical drive to be permeable to coffee and coffee powder. It is also possible to arrange a bevel gear pair at this place.

To simplify manufacture, it is preferred to design both transmissions to include corresponding elements. It is preferred that each transmission includes a nut which is rotatable but which cannot be moved in an axial direction. The nut includes an inner thread which cooperates with an outer thread located on the spindle of the vertical drive and on the pivot column of the combined axial and pivotal drive, respectively. For example, the toothed belt engages the outer circumference of the nut.

It is preferred to arrange a guiding ring in the upper region of the pivot column, the guiding ring being designed and arranged to be rotatable, but not to be movable in an axial direction. The guiding ring is fixedly connected to the pivot column to be commonly rotated therewith and to be movable with respect to the pivot column in an axial direction. The pivoted coffee removing element for discharging the tablet of coffee powder and/or the funnel for introducing the coffee powder into the brewing chamber are fixedly connected to the guiding ring to be commonly rotated therewith. The guiding ring only has a small axial extension, and it thus does not require a lot of room. However, it fulfills all necessary functions relating to the pivotal movement of the pivoted coffee removing element and the funnel.

A non-circular connection unit may be arranged between the pivot column and the guiding ring. This connection unit may include a flattened portion located at the pivot column to be continuous in an axial direction and a counter protrusion being located at the guiding ring. However, it is also possible to use other non-circular connection units with or without clearances. In this way, different overlaps with the pivotal movement of the rotating arm are possible.

The sliding path in the pivot column includes a beginning portion which is parallel to the axis. The beginning portion serves to transfer the upper locking element from the brewing position into the stand-by position and vice versa. A rotational movement of the pivot column is prevented in this beginning portion which is parallel to the axis, and a stroke-like movement parallel to the axis is realized. This movement at least occurs in the region in which the upper locking element is arranged in the tube section of the brewing chamber. It is preferred to use a soft transition between this region and the thread-like increased region.

The thread-like increased region subjects the rotary arm with the upper locking element being fixedly connected thereto to a pivotal movement from the stand-by position into the parking position and vice versa. During this pivotal movement, the upper locking element moves away from the axis of the tube section such that the space located above the tube section is accessible. The stand-by position is located at a lower level than the parking position such that it is possible to move below exiting chutes of coffee mills located above the tube section without problem in the stand-by position. At the same time, relative lifting of the upper locking element into the parking position is advantageous in the sense of allowing for a position for cleaning the upper locking element by spraying a respective amount of water. This cleaning water may be discharged through a respective outflow, and it thus does not enter the brewing chamber. The pivoted coffee removing element is arranged behind the upper locking element. This means that it follows the upper locking element when pivoting the upper locking element from the stand-by position into the parking position. This allows for the advantage of the space into which the used tablet may be lifted being free from the upper locking element such that the pivoted coffee removing element may fulfill its function. The pivoted coffee removing element preferably is designed to have an approximately semicircular shape the concave side of which being associated with the upper locking element. In this way, it is possible to use the pivoted coffee removing element to discharge the tablet when transferring the upper stop element from the stand-by position into the parking position without making the brewing cycle more complicated. The non-circular connection unit between the guiding ring and the pivot column may be arranged to be parallel to the axis. Thus, it is straight and it may be easily manufactured. The rotational movement is derived from the thread-like increasing region of the sliding path located in the pivot column.

The rotary arm at its side facing away from the upper locking element may be enlarged to protrude beyond the pivot column, and it may include a stop. A counter stop associated with the stop may be arranged at the housing. The stop of the rotary arm contacts the counter stop in the brewing position of the upper locking element. The stop or the counter stop may be designed to be adjustable such that the position of the upper locking element in the brewing position is determined. When pressure acts upon the upper locking element in the brewing chamber during brewing, a respective counter force between the stop and the counter stop may be absorbed such that the pivot column is free from bending loads. This is a positive effect concerning the support, operational safety and durability of the pivot column. The guiding ring may also form the bearing for the pivot column.

The pivoted coffee removing element is fixedly connected to the guiding ring to be commonly rotated therewith, especially by a screw connection. In this way, any rotational movement of the guiding ring is transmitted to the pivoted coffee removing element. The guiding ring cannot move an in axial direction, and it can only rotate on the spot in coordination with the pivot column.

The first and second motor for the drive of the pivot column and of the lower locking element, respectively, may be designed as electric motors, especially as direct current motors. A nut and spindle unit may be arranged between the first motor and the dividing transmission, the spindle being fixedly connected to the pivot column to he commonly rotated therewith. The nut is arranged to be rotatable, but it cannot move in an axial direction such that the pivot column fulfills a stroke-like movement when rotating the nut on the spot. The motor for the drive may also be designed as a hydraulic motor and the like, for example. However, it is preferred to use an electric motor which allows for the possibility of exact and reproducible control. The same applies to the second motor of the vertical drive.

The motor for moving the lower locking element may also be designed as an electric motor, especially as a direct current motor. Both drives and motors, respectively, may be designed to be similar or even identical.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
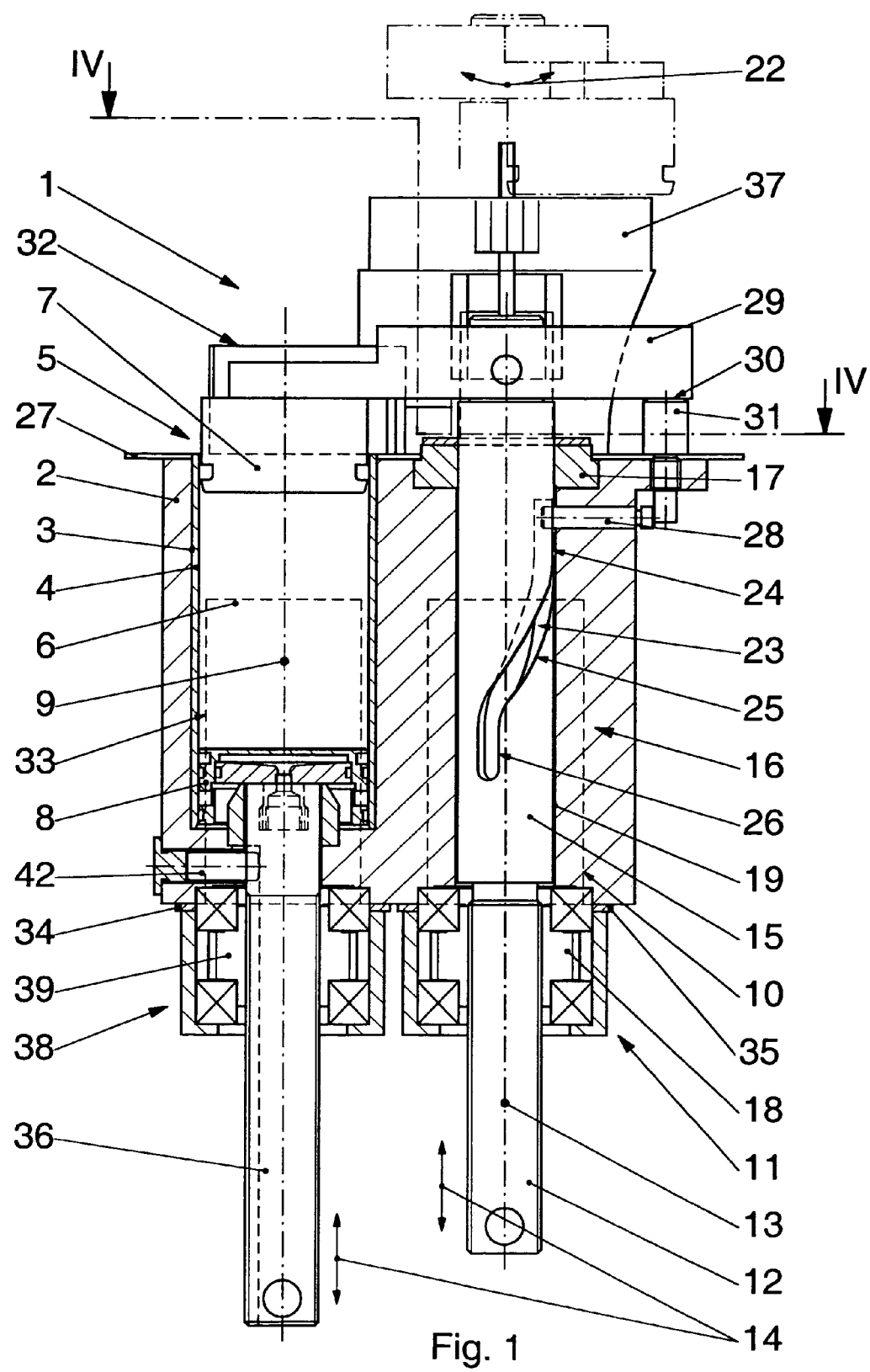
FIG. 1 is a vertical sectional view through an exemplary embodiment of the novel automatic coffee machine.

Referring now in greater detail to the drawings, FIGS. 1–4 illustrate an exemplary embodiment of the novel automatic coffee machine 1. The automatic coffee machine 1 includes a common housing 2. A flow heater (not illustrated) including a hot water chamber (not illustrated) may be arranged in the inside of the common housing 2. The housing 2 includes a bore 3. A tube section 4 is inserted into the bore 3 in a sealed way. The tube section 4 is part of a brewing unit 5. A brewing chamber 6 of the brewing unit 5 is limited and defined, respectively, by an upper locking element 7 and a lower locking element 8. Usually, the upper stop element 8 is designed as a "water piston". This means that water is introduced into the brewing chamber 6 during brewing of coffee from here to be sent through the coffee powder. The lower locking element 8 usually is designed as "coffee piston". This means that it serves as the carrier for the tablet of coffee powder. However, it is also possible to use and operate, respectively, the stop elements 7 and 8 in the opposite manner.

The lower locking element 8 always remains located in the tube section 4, and it is only moved in an axial direction to fulfill a stroke corresponding to the vertical axis 9. The upper locking element 7 is moved out off the tube section 4 in the direction of the axis 9, and it is then pivoted in a lateral direction to be capable of feeding coffee powder through the clear opening of the tube section 4 and of the brewing chamber 6, respectively. The two locking elements 7 and 8 have a design similar to a piston, and they include seals which are not illustrated for reasons of easier understanding the drawings. The lower locking element 8 includes a screen for passage of the coffee and an outlet for delivery of the coffee in a known way.

A first motor 10 serves for movement of the upper locking element 7, the motor 10 being arranged above the lower end of the housing 2. A transmission 11 (FIG. 2) is located downstream of the motor 10. A nut and spindle unit is part of the transmission 11. The spindle 12 of the nut and spindle unit has a vertical axis 13. The axis 13 extends parallel to the axis 9 at a respective distance. The nut 18 associated with the spindle 12 is not illustrated in FIG. 1 in greater detail, and it is only indicated in FIG. 2. The nut 18 is designed and arranged to be rotatable and not to be movable in an axial direction such that the spindle 12 fulfills a pure stroke-like movement in the direction of the axis 13 according to double arrow 14 when the nut 18 is rotated. The spindle 12 is fixedly connected to a pivot column 15 of a dividing transmission 16 to be commonly rotated with the pivot column 15. The dividing transmission 16 also protrudes through the housing 2 of the automatic coffee machine 1. It is to be seen in FIGS.

1 and 3 how the housing 2 extends in a lateral direction such that the brewing apparatus 5 is arranged in the housing 2 at one side and the dividing transmission 16 is arranged in the housing 2 at the other side. The pivot column 15 is part of the dividing transmission 16. The pivot column 15 is supported in a bore 19 located in the housing 2. A sliding block 28 engages the bore 19. The guiding block 28 is screwed into the housing 2 in a radial direction from outside towards the inside, and it cooperates with the pivot column 15 in this way.

A guiding ring 17 is rotatably supported in the housing 2 in the upper region of the bore 19. The guiding ring 17 includes a non-circular connection unit 20 (FIG. 4) with a flattened portion 21 extending along the axial stroke of the pivot column 15. A counter protrusion located at the guiding bush 17 is associated with the flattened portion 21. A cover plate 27 in this way prevents the guiding ring 17 from moving in an axial direction according to arrow 14, and it allows for a relative pivotal movement according to double arrow 22 about the axis 13.

A sliding path 23 is arranged in the pivot column 15. The sliding path 23 is to be best seen in FIG. 1. The sliding path 23 is designed as a channel or a groove located in the surface of the pivot column 15. The sliding path 23 includes a beginning portion 24 at its lower end which is parallel to the axis of the pivot column 15. A portion 25 having a shape similar to a thread follows after a respective transition portion. The sliding path 23 at its upper end may again include a portion 26 which is parallel to the axis of the pivot column 15. Due to the fact that the pivot column 15 is a mountable shaft element, even a complicated shape of the sliding path 23 may be easily produced.

The sliding block 23 cooperates with the sliding path 23. The sliding block 28 is fixedly located at the housing 2, and it extends into the sliding path 23 in a radial direction from outside towards the inside. The pivot column 15 in this way does not only protrude through the housing 2 in a vertical direction, but it also extends beyond the housing 2 in an upward direction. A rotary arm 29 (FIGS. 1 to 3) is fixedly connected to the pivot column 15 to be commonly rotated therewith. The upper locking element 7 of the brewing unit 5 is fixedly supported at one free end of the rotating arm 29. The rotating arm 29 at its side facing away from the upper locking element 7 includes a stop 30 which cooperates with a counter stop 31 being located at the housing 2. The counter stop 31 may be designed as an adjustable screw to determine the brewing position of the upper locking element 7 and support for the upper locking element 7 in the brewing position.

A pivoted coffee removing element 32 and a funnel 37 are fixedly connected to the guiding ring 17 to be commonly rotated therewith. These elements fulfill a pure rotational movement or pivotal movement about the axis 13 according to double arrow 22 as it applies to the guiding ring 17. In the parking or parked position, the funnel 37 reaches a position above the brewing chamber 6 and the axis 9, respectively, such that coffee powder may be introduced into the brewing chamber 6 during a following brewing cycle. The coffee powder comes from a mill, and it reaches the brewing chamber 6 via a chute and the funnel 37. In the parking position, the upper stop element 7 is located above a stationary discharge funnel such that the upper locking element 7 may be cleaned with hot water.

The upper locking element 7 generally has three different positions. A first position is the brewing position in which the upper locking element 7 is located in the tube section 4 of the brewing chamber 6, as this is illustrated in FIG. 1 by the continuous line. The coffee is brewed in this position. A second position is the stand-by position in which the upper locking element 7 is located in the direction of the axis 9, but outside of the tube section 4 and above the tube section 4. This position is not illustrated in the drawings. Finally, the third position is the parking position or parked position of the upper locking element 7 as it is illustrated in FIG. 1 by a broken line and in FIGS. 2 and 3 by a continuous line. In this parking position, the upper locking element 7 is pivoted away from the axis 9 of the tube section 4 according to double arrow 22. Furthermore, it is lifted in an axial direction, for example, to arrange a discharging funnel and a discharging conduit for cleaning water below the locking element 7 in the parking position. In this way, the upper locking element 7 may be cleaned in the parking position. The parking position also is the position in which the upper locking element 7 is located between two brewing cycles. In other words, each brewing cycle begins and ends in the parking position.

The lower locking element 8 is also connected to a drive. This drive is designed as a pure lifting drive or a vertical drive according to double arrow 14 in the direction of the axis 9. The vertical drive includes another motor 33 being located above the housing 2 and being independent from the first motor 10 which is also located above the upper locking element 7. For example, the motors 10 and 33 may be arranged on separate supporting plates 34 and 35, respectively. The motors 10 and 33 especially may be designed as electric motors, hydraulic motors and the like. It is possible that the motors 10 and 33 have the same design. A transmission 38 is located downstream of the motor 33. A spindle 36 is driven to move in an axial direction within the axis 9 according to arrow 14. The spindle 36 is driven by a nut 37 which is arranged not to be movable in an axial direction, but to be rotatable. The lower locking element 8 is arranged at the upper end of the spindle 36. The lower locking element 8 is illustrated in its lower end position in FIG. 1. It is further introduced into the brewing chamber 6 in an upward direction to reach the brewing position. During a brewing cycle, the lower locking element 8 may be moved into the tube section 4 in an upward direction until its upper surface is aligned to the outer end plane of the housing 2.

FIG. 1 especially illustrates the very simple structure of the dividing transmission 16. The dividing transmission 16 includes the pivot column 15 being supported in the bore 19, the sliding path 23 and the stationary sliding block 28. The pivot column 15 furthermore includes the continuous flattened portion 21 serving to carry along the guiding ring 17.

Figure 2:
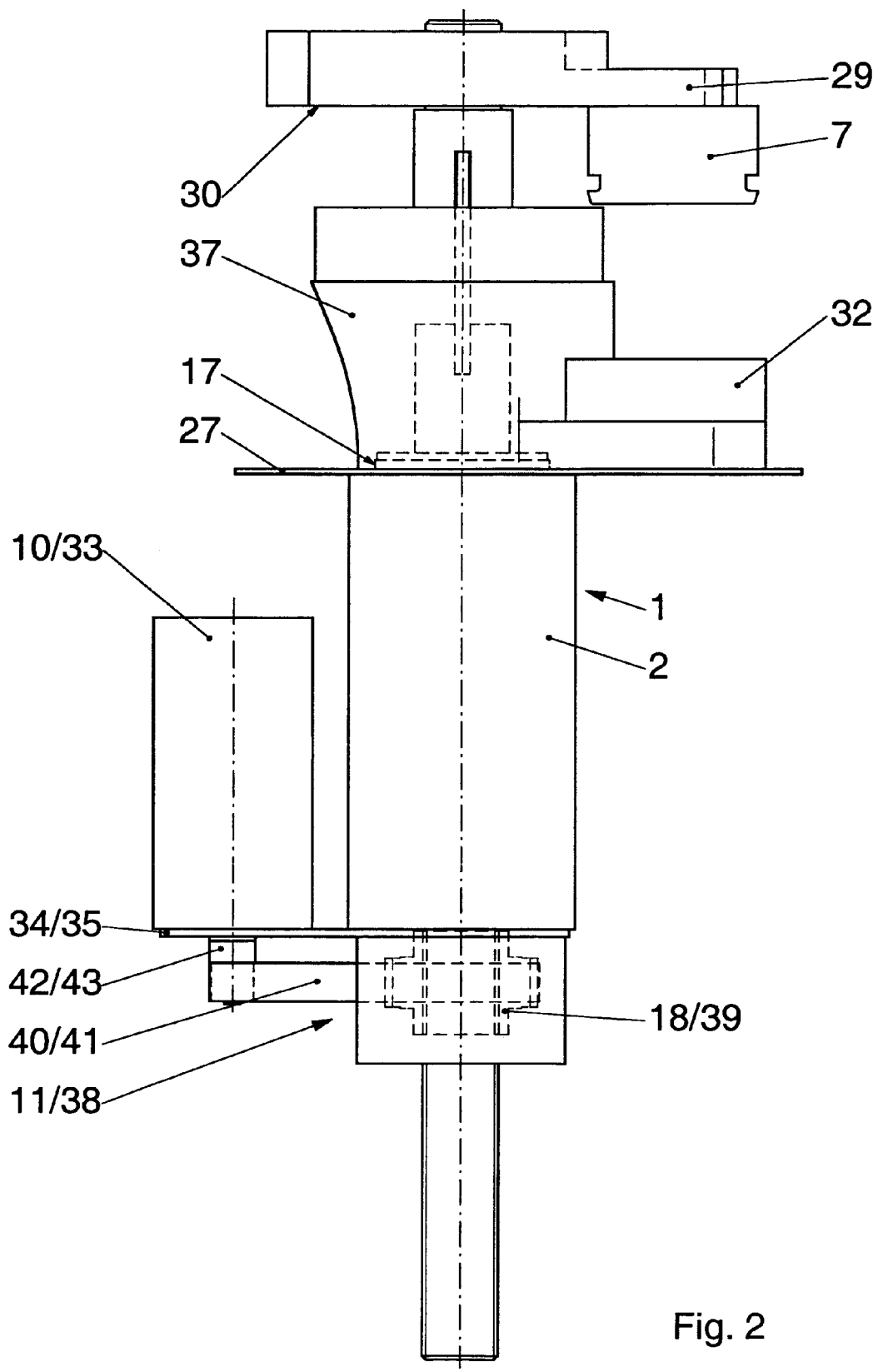
FIG. 2 is a side view of the novel automatic coffee machine of FIG. 1.

The combination of FIGS. 1–4 makes it possible to fully understand the design and arrangement of the drives. It is already to be seen in FIG. 1 that the two motors 10, 33 are arranged above the nuts 18, 39 of the transmissions 11, 38. The pinions 42, 43 being located on the shafts of the motors 10, 33 face in a downward direction, and they are connected to the nuts 18, 39 by a toothed belt 40, 41. Due to the fact that the two drives have the same design, FIG. 2 illustrates these two drives in one figure by using the reference numerals of the two drives at the same time. The axes of the motors 10, 33 are arranged to be perpendicular and parallel and to be spaced apart to the axes 9 and 13. In case the seal of the lower locking element 8 fails, exiting coffee and coffee powder may pass through the transmission 38, and it drips off. Consequently, coffee and coffee powder does not enter the motor 33 as well as the motor 10 and the associated transmission 11.

A brewing cycle takes place as follows:

The upper locking element 7 is located in the parking position (also see FIG. 3) being illustrated by a broken line in FIG. 1. The lower locking element 8 is located in the lowermost position illustrated in FIG. 1. The tube section 4 of the brewing chamber 6 is opened in an upward direction. When starting a brewing cycle at a control unit (not illustrated in greater detail), coffee powder is milled by a coffee mill (not illustrated). The coffee powder falls down on a chute being located at the mill and trough the funnel 37 to reach the interior of the brewing chamber 6 and to be thus located on the lower locking element 8. Due to the fact that the rotational arm 29 together with the upper locking element 7 is pivoted about a comparatively great pivot angle (FIG. 3) in the parking position, there is the possibility of arranging up to three coffee mills with the associated chutes to end above the brewing chamber 6. In this way, different coffee beans may be milled to reach the brewing chamber 6 to provide a variety of different kinds of coffee.

Figure 3:
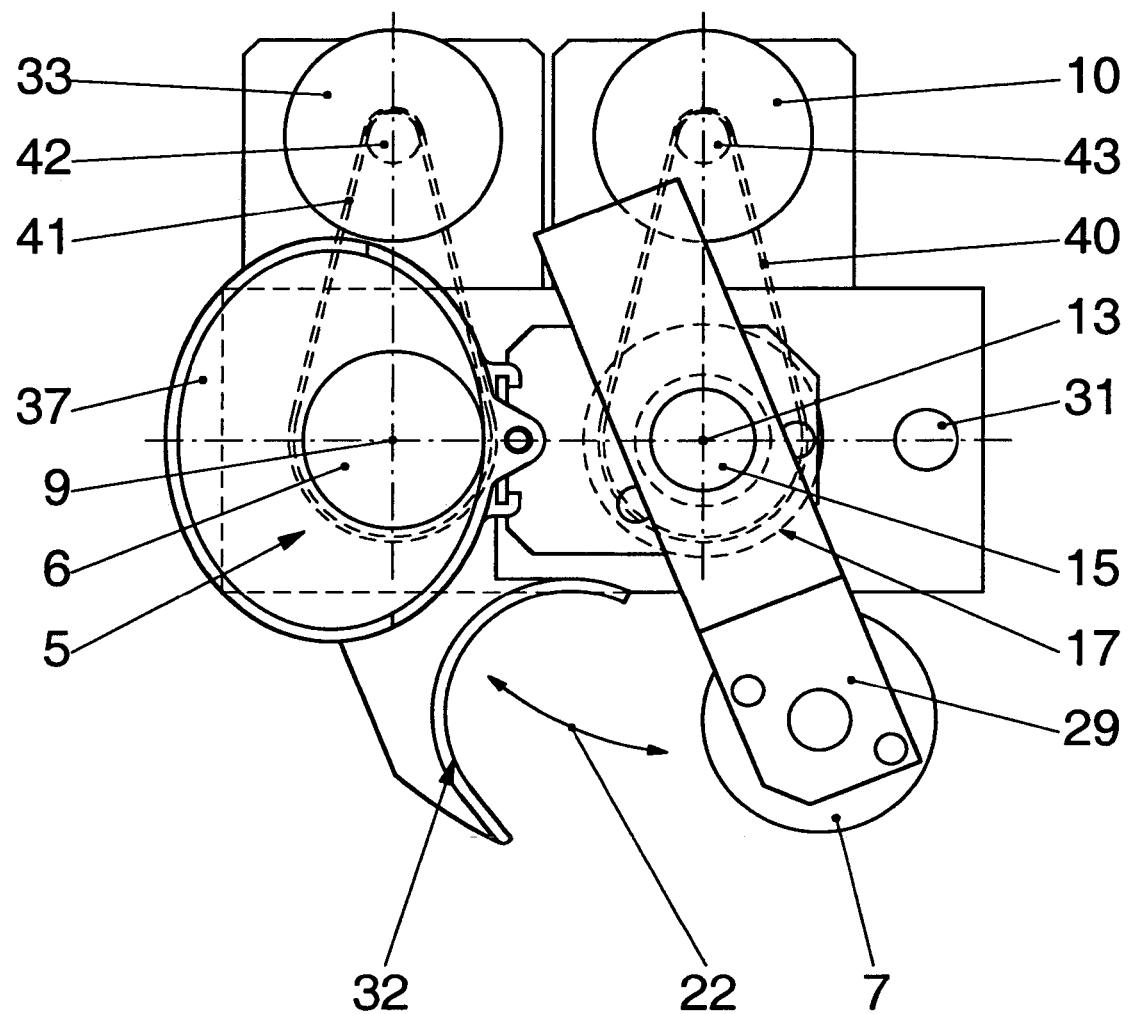
FIG. 3 is a top view of the novel automatic coffee machine of FIG. 1.
Figure 4:
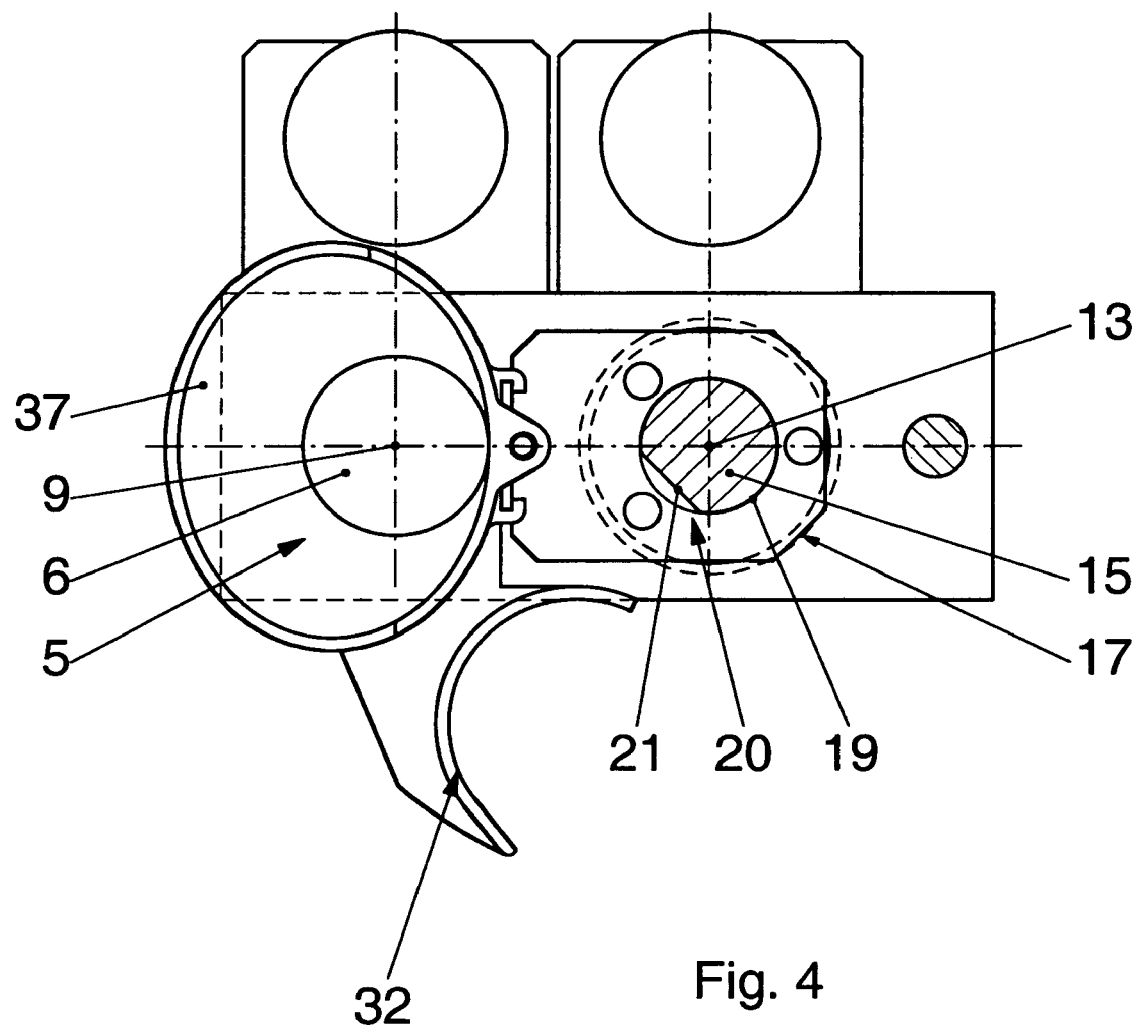
FIG. 4 is a sectional view along line IV—IV in FIG. 1.

As soon as milling has been completed, the motor 10 is actuated to rotate in such a sense of rotation that the rotational arm 29 with the upper locking element 7 is pivoted from the parking position into the stand-by position. This is achieved by a combined pivotal movement and a lowering movement in a clockwise direction about the axis 13 according to double arrow 22 (FIG. 3). During this movement, the pivoted coffee removing element 32 with the funnel 37 is also pivoted. Although the spindle 12 and thus the pivot column 15 is only lowered in the direction of the axis 13 by the motor 10 a pivotal movement is added by the thread-like decreasing portion 22 of the sliding path 23 and by the sliding block 28 of the pivot column 15. This movement lasts until the end of the portion 25 at the transition region to the portion 24 (which is parallel to the axis) of the sliding path 23 has been reached. The upper locking element 7 is then located such that its axis is aligned to the axis 9, but still above the tube section 4 and such that it does not protrude into the tube section 4. With this movement, the guiding ring 17 and the pivoted coffee removing element 32 and the funnel 37 connected thereto are subjected to a return movement. This movement is a pure rotational movement in a clockwise direction according to double arrow 22 (FIG. 3). The pivoted coffee removing element 32 does not fulfill a function during this movement. However, when choosing a respective design, this movement may be used to remove coffee powder which is located on the surface of the housing 2 in the region of the tube section 4 in an undesired way.

However, the motor 10 still runs in the stand-by position. In other words, the elements move through the stand-by position as described above without interruption of the movement of the motor 10. The sliding block 28 thus reaches the beginning portion 24 (which is parallel to the axis) of the sliding path 23 via the transition portion such that the upper locking element 7 may be moved from the standby position into the brewing position by a pure axial lowering movement. During this movement, the seal of the upper locking element 7 is introduced into the tube section 4. Thus, the brewing position for the upper locking element 7 is reached, as this is illustrated in FIG. 1. At the same time, the stop 30 contacts the counter stop 31 from above. The brewing position has been reached. The motor 33 of the vertical drive for the lower locking element 8 is now actuated, and the lower locking element 8 is lifted. The lower locking element 8 is moved in an upward direction such that the coffee powder contained in the brewing chamber 6 is compressed to form a tablet. During this movement, the lower locking element 8 presses against the stationary upper locking element 7. After pressing, a release operation for the tablet may preferably take place. This means that the sense of rotation of the motor 33 is inverted. It is to be understood that the distance along which the lower locking element 8 is moved in a downward direction is comparatively small. Then, the actual brewing operation may start. This means that the control unit opens a respective valve, and it actuates a pump for hot water such that a respective volume of hot water is pressed through the upper locking element 7, the compressed tablet of coffee powder and the lower locking element 8. Consequently, the ready to be used coffee is discharged at a coffee outlet into a cup, a small jug or a different vessel. The brewing process has been finished, and the upper locking element 7 may be moved from the brewing position back into the stand-by position and further into the parking position. For this purpose, the motor 10 is actuated to rotate in the other sense of rotation. At first, the sliding block 28 is located in the beginning portion 24 (which is parallel to the axis) of the sliding path 23 such that the upper locking element 7 is moved in an axial upward direction from the brewing position into the stand-by position. It then moves through the standby position, and the sliding block 28 reaches the inclined portion 25 of the sliding path 23. This causes the pivotal movement of the rotational arm 29 together with the upper locking element 7 to leave the stand-by position and to reach the parking position. Furthermore, the pivoted coffee removing element 32 being connected to the guiding ring 17 is also pivoted in a clockwise direction (FIG. 3). The element 32 is moved to pivot above the surface of the housing 2. In coordination with this pivotal movement, the motor 33 for the lower locking element 8 has been actuated to lift the used tablet of coffee powder by an axial lifting movement in the tube section 4 in an upward direction above the surface of the housing 2 such that this tablet is contacted by the pivoted coffee removing element 32 during the return movement of the rotational arm 29 to be dumped into a container for used tablets of coffee powder in a lateral direction. As soon as the tablet has been dumped, the motor 33 is again operated to rotate in the opposite sense of rotation to reach the lower position according to FIG. 1. At the same time, the upper locking element 7 reaches the parking position above the discharge funnel such that the cleaning operation may start. The funnel 37 is located above the brewing chamber 6, and it feeds fresh milled coffee powder into the brewing chamber 6 at the beginning of a following brewing cycle.

Many variations and modifications may be made to the preferred embodiments of the invention without departing substantially from the spirit and principles of the invention. All such modifications and variations are intended to be included herein within the scope of the present invention, as defined by the following claims.

I claim:

1. An automatic coffee machine, comprising:
   a housing;
   a sliding block, said sliding block being fixedly connected to said housing;
   a brewing unit, said brewing unit including an upper locking element having an axis, a lower locking element and a tube section having a vertical axis, said upper and lower locking elements and said tube section being designed and arranged to alternately attain a brewing position, a stand-by position and a parking position,
      said upper locking element in the brewing position protruding into said tube section such that a brewing chamber is formed in which coffee can be brewed, said upper locking element in the stand-by position not protruding into said tube section and the axis of said upper locking element being aligned with the axis of said tube section, said upper locking element in the parking position not protruding into said tube section and the axis of said upper locking element not being aligned with the axis of said tube section;

a rotary arm, said rotary arm being connected to said upper locking element; and a pivot column, said pivot column having a circumference and an axis, said pivot column being connected to said rotary arm, said pivot column being designed and arranged to be movable in an axial direction and to be rotatable about its axis, said pivot column including a sliding path, said sliding path including a first portion which is parallel to the axis of said pivot column and a second portion which extends about at least a part of the circumference of said pivot column in a way similar to a thread and not to be parallel to the axis of said pivot column, said first portion of said sliding path of said pivot column being designed and arranged such that said sliding block engages said first portion to alternately attain the brewing position and the stand-by position, said second portion of said sliding path of said pivot column being designed and arranged such that said sliding block engages said second portion to alternately attain the stand-by position and the parking position.

2. The automatic coffee machine of claim 1, further comprising a first drive, said first drive including a first motor and a first transmission, said first transmission being arranged downstream of said first motor, said first transmission being operatively connected to said first motor to be driven by said first motor, said first transmission being operatively connected to said pivot column to drive said pivot column.

3. The automatic coffee machine of claim 2, wherein said first motor has an axis and said rotary arm has an axis, the axis of said motor being arranged to be parallel to and spaced apart from the axis of said rotary arm.

4. The automatic coffee machine of claim 3, wherein said first motor is arranged above said first transmission.

5. The automatic coffee machine of claim 2, further comprising a pivoted coffee removing element, said pivoted coffee removing element being designed and arranged to be pivoted to remove a tablet of coffee powder from said lower locking element after use of the tablet of coffee powder.

6. The automatic coffee machine of claim 5, wherein said first motor is designed and arranged to drive said pivoted coffee removing element.

7. The automatic coffee machine of claim 2, further comprising a second drive, said second, drive including a second motor and a second transmission, said second transmission including a spindle, said spindle being driven by said second motor and being operatively connected to said lower locking element such that said lower locking element is moved in said tube section in the direction of the vertical axis of said tube section.

8. The automatic coffee machine of claim 7, wherein said first and second drive are designed and arranged to be independent from one another.

9. The automatic coffee machine of claim 7, wherein said second motor has an axis and said brewing chamber has an axis, said axis of said second motor being arranged to be parallel to and spaced apart from the axis of said brewing chamber.

10. The automatic coffee machine of claim 7, wherein the axis of said second motor is arranged above said second transmission.

11. The automatic coffee machine of claim 2, wherein said first transmission includes at least one element selected from the group consisting of a toothed belt, a V-belt and two engaging gear wheels.

12. The automatic coffee machine of claim 7, wherein said second transmission includes at least one element selected from the group consisting of a toothed belt, a V-belt and two engaging gear wheels.

13. The automatic coffee machine of claim 7, wherein said first and second motor are designed as electric motors.

14. The automatic coffee machine of claim 13, wherein said first and second motor are designed as direct current electric motors.

15. The automatic coffee machine of claim 1, further comprising a guiding ring, said guiding ring being arranged in said housing to be rotatable with respect to said housing, said guiding ring being arranged in said housing not to be movable in an axial direction with respect to said housing, said guiding ring being connected to an upper region of said pivot column in a way to be commonly rotated with said pivot column.

16. The automatic coffee machine of claim 15, further comprising a pivoted coffee removing element, said pivoted coffee removing element being designed and arranged to be pivoted to remove a tablet of coffee powder from said lower locking element after use of the tablet of coffee powder, said pivoted coffee removing element being fixedly connected to said guiding ring to be commonly rotated therewith.

17. The automatic coffee machine of claim 15, further comprising a non-circular connection unit, said non-circular connection unit being formed between said pivot column and said guiding ring to connect said pivot column and said guiding ring.

18. The automatic coffee machine of claim 17, wherein said non-circular connection unit includes a flattened portion and a counter stop, said flattened portion being located at said pivot column to continuously extend in an axial direction, said counter protrusion being located at said guiding ring.

19. The automatic coffee machine of claim 1, wherein said rotary arm at its side facing away from said upper locking element is enlarged to protrude beyond said pivot column, said rotary arm includes a stop, said housing includes a counter stop, said counter stop being associated with said stop, said stop being designed and arranged to contact said counter stop in the brewing position.

20. The automatic coffee machine of claim 1, wherein said sliding path further includes a third portion, said end portion being designed and arranged to be parallel to the axis of said pivot column.

* * * * *